United States Patent [19]

Olivo

[11] Patent Number: 4,804,714
[45] Date of Patent: Feb. 14, 1989

[54] POLYOLEFIN BLENDS

[75] Inventor: Anthony R. Olivo, Neshanic Station, N.J.

[73] Assignee: Union Carbide Corporation, Danbury, Conn.

[21] Appl. No.: 123,360

[22] Filed: Nov. 20, 1987

[51] Int. Cl.$^4$ .................. C08L 23/08; C08L 23/20; C08L 23/16
[52] U.S. Cl. .................................................. 525/240
[58] Field of Search ......................................... 525/240

[56] References Cited

U.S. PATENT DOCUMENTS

| | | | |
|---|---|---|---|
| 4,429,079 | 1/1984 | Shibata et al. | 428/35 |
| 4,438,238 | 3/1984 | Fukushima et al. | 428/220 |
| 4,590,124 | 5/1986 | Schoenberg | 428/516 |

FOREIGN PATENT DOCUMENTS

| | | |
|---|---|---|
| 52-039741 | 3/1977 | Japan. |
| 57-059943 | 4/1982 | Japan. |
| 56-038738 | 3/1983 | Japan. |
| 58-219292 | 11/1983 | Japan. |
| 58-222131A | 12/1983 | Japan. |
| 59-022945A | 2/1984 | Japan. |

Primary Examiner—Carman J. Seccuro
Attorney, Agent, or Firm—Saul R. Bresch

[57] ABSTRACT

A polyolefin blend comprising:
(a) a linear low density copolymer of ethylene and at least one alpha-olefin having 3 to 6 carbon atoms produced in the presence of an activated supported catalyst containing chromium and titanium, said copolymer having a density in the range of about 0.916 to about 0.922 gram per cubic centimeter and a melt index in the range of about 0.30 to about 1.2 grams per 10 minutes and being present in an amount of about 55 to about 75 percent by weight; and
(b) a very low density copolymer of ethylene and at least one alpha-olefin have 3 to 8 carbon atoms produced in the presence of an activated supported catalyst containing magnesium, titanium, a hydrocarbyloxy moiety, halogen, and an electron donor, said copolymer having a density in the range of about 0.890 to about 0.910 gram per cubic centimeter and a melt index in the range of about 0.30 to about 8.0 grams per 10 minutes and being present in an amount of about 25 to about 45 percent by weight, the percent by weight being based on the total weight of components (a) and (b).

1 Claim, No Drawings

POLYOLEFIN BLENDS

TECHNICAL FIELD

This invention relates to polyolefin blends, i.e., blends of very low density polyethylene with linear low density polyethylene.

BACKGROUND ART

Linear low density polyethylene (LLDPE) inherently has a higher rigidity (modulus) than a high pressure low density polyethylene of the same density and, therefore, is restricted from some market areas that require lower rigidity. Very low density polyethylene (VLDPE), i.e., polyethylene having a density of less than 0.915 gram per cubic centimeter, has a lower rigidity than LLDPE because of its lower density. However, VLDPE also has its restrictions. The narrow molecular weight distribution makes VLDPE very difficult to process because of the higher melt viscosity. Increasing the melt index of VLDPE to improve the processing characteristics is helpful, but the extractables then increase and virtually eliminate VLDPE products from any Food and Drug Administration (FDA) end use application. A blend of the two, i.e., VLDPE and LLDPE, which would result in a resin that would be easy to process, have a lower rigidity, higher environmental stress cracking resistance, and lower extractables thus meeting FDA requirements, was suggested.

It was observed, however, that neither LLDPE nor VLDPE had adequate optical properties for certain applications which require film or sheet having a percent haze per millimeter of thickness of no greater than about 2.50.

DISCLOSURE OF THE INVENTION

An object of this invention, therefore, is to provide a blend of VLDPE and LLDPE, which can be processed with facility, has relatively low Secant Modulus, relatively high environmental stress cracking resistance, and sufficiently low extractables to meet FDA requirements, and, in addition, meets the required optical properties.

Other objects and advantages will become apparent hereinafter.

According to the present invention, the above object is fulfilled by a polyolefin blend comprising:

(a) a linear low density copolymer of ethylene and at least one alpha olefin having 3 to 6 carbon atoms produced in the presence of an activated supported catalyst containing chromium and titanium, said copolymer having a density in the range of about 0.916 to about 0.922 gram per cubic centimeter and a melt index in the range of about 0.30 to about 1.2 grams per 10 minutes and being present in an amount of about 55 to about 75 percent by weight; and (b) a very low density copolymer of ethylene and at least one alpha-olefin have 3 to 8 carbon atoms produced in the presence of an activated supported catalyst containing magnesium, titanium, halogen, and an electron donor, said copolymer having a density in the range of about 0.895 to about 0.910 gram per cubic centimeter and a melt index in the range of about 0.30 to about 8.0 grams per 10 minutes and being present in an amount of about 45 to about 35 percent by weight, the percent by weight being based on the total weight of components (a) and (b).

DETAILED DESCRIPTION

The LLDPE is a copolymer of ethylene and at least one alpha-olefin having 3 to 6 carbon atoms produced in the presence of an activated supported catalyst containing chromium and titanium, each in catalytically effective amounts. The copolymer can be made in accordance with the disclosure in U.S. Pat. No. 4,101,445 issued on July 18, 1978. The LLDPE can have a density in the range of about 0.916 to about 0.922 gram per cubic centimeter and preferably has a density in the range of about 0.917 to about 0.919 gram per cubic centimeter. The melt index can be in the range of about 0.30 to about 1.2 grams per 10 minutes and is preferably in the range of about 0.6 to about 0.8 gram per 10 minutes. The melt index is determined in accordance with ASTM D-1238, Condition E, and measured at 190° C. The LLDPE is present in the blend of LLDPE and VLDPE in an amount of about 55 to about 75 percent by weight based on the total weight of the blend and is preferably present in the blend in an amount of about 68 to about 72 percent by weight.

The VLDPE is a copolymer of ethylene and at least one alpha-olefin having 3 to 8 carbon atoms produced in the presence of an activated supported catalyst containing magnesium, titanium, a hydrocarbyloxy moiety (optional), a halogen, and an electron donor, each in catalytically effective amounts. The copolymer can be prepared as described in U.S. Pat. No. 4,302,565 issued on Nov. 24, 1981. The VLDPE can have a density in the range of about 0.89 to about 0.910 gram per cubic centimeter and preferably has a density in the range of about 0.900 to about 0.905 gram per cubic centimeter. The melt index is determined as above and can be in the range of about 0.30 to about 8.0 grams per 10 minutes and is preferably in the range of about 1.0 to about, 5.0 grams per 10 minutes. The VLDPE is present in the blend in an amount of about 25 to about 45 percent by weight based on the total weight of the two components, LLDPE and VLDPE, and is preferably present in an amount of about 28 to about 32 percent by weight.

The abovementioned patents are incorporated by reference herein.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters.

The invention is illustrated by the following examples:

EXAMPLE 1

The LLDPE is typically prepared as follows:

A microspheroidal intermediate density silica having a surface area of about 300 square meters per gram and a pore diameter of about 200 angstroms is dried at 200° C. for 8 hours. The dried silica (481 grams) is stirred with a dry solution of isopentane containing 8.3 grams of unsubstituted bis(cyclopentadienyl)chromium II (chromocene) and 168 grams of tetraisopropyl titanate. The isopentane is removed by evaporation leaving a dry residue containing 1.1% by weight of chromocene and 35% by weight of tetraisopropyl titanate codeposited on the silica support. The residue is activated by heating for 2 hours under nitrogen at 150° C., and, then, 2 hours at 300° C. The nitrogen atmosphere is replaced by air and heating continued at 300° C. for 2 hours. Finally, the temperature is raised to 800° C. and kept there for 8 hours.

The catalyst is introduced into a 14 inch diameter fluid bed reactor at 84° C. and 300 psig with a 1 butene-/ethylene mixture. The weight ratio of 1 butene to ethylene is 0.083.

The properties of the LLDPE produced in this example can be found in Example 8.

EXAMPLE 2

The VLDPE is typically prepared as follows:

Into a 12 liter flask equipped with a mechanical stirrer are placed 41.8 grams (0.439 mol) anhydrous $MgCl_2$ and 2.5 liters tetrahydrofuran (THF). To this mixture, 27.7 grams (0.184 mol) of $TiCl_4$ is added dropwise over $\frac{1}{2}$ hour. It may be necessary to heat the mixture to 60° C. for about $\frac{1}{2}$ hour in order to completely dissolve the material.

500 grams of porous silica dehydrated at 800° C. and optionally treated with 4 to 8 weight percent triethylaluminum are added to the above solution and stirred for $\frac{1}{4}$ hour. The mixture is dried with a $N_2$ purge at 60° C. for about 3 to 5 hours to provide a dry, free flowing powder having the particle size of the silica. The absorbed precursor composition has the formula $$TiMg_{3.0}Cl_{10}(THF)_{6.7}$$

The desired weight of impregnated precursor composition and activator compound, e.g., triethylaluminum, is added to a mixing tank with a sufficient amount of anhydrous aliphatic hydrocarbon diluent such as isopentane to provide a slurry system.

The activator compound and precursor compound are used in such amounts as to provide a partially activated precursor composition which has an Al/Ti ratio of up to 10:1 and preferably of 4 to 8:1.

The contents of the slurry system are then thoroughly mixed at room temperature and at atmospheric pressure for about $\frac{1}{4}$ to $\frac{1}{2}$ hour. The resulting slurry is dried under a purge of dry inert gas such as nitrogen or argon, at atmospheric pressure and at a temperature of 65°±10° C. to remove the hydrocarbon diluent. This process usually requires about 3 to 5 hours. The resulting catalyst is in the form of a partially activated precursor composition which is impregnated within the pores of the silica. It is injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. This dilute solution contains about 5 to 30 percent by volume of the activator compound.

The activator compound is added to the polymerization reactor so as to maintain the Al/Ti ratio in the reactor at a level of about 10 to 400:1 and preferably of 15 to 60:1.

The catalyst system contains 14.5 weight percent of precursor composition. It is partially activated with triethylaluminum so as to provide the silica/precursor composition with an Al/Ti mol ratio of 5:1. The completion of the activation of the precursor composition in the polymerization reactor is accomplished with a 5 percent by weight solution of triethylaluminum in iso-pentane so as to provide a completely activated catalyst in the reactor with an Al/Ti mol ratio of 25 to 30.

Ethylene is then copolymerized with 1-butene. The reaction is conducted, after equilibrium is reached, for 1 hour at 85° C. and under a pressure of 300 psig, a gas velocity of about 3 to 6 times Gmf, and a space time yield of about 4.4 to 6.3 in a fluid bed reactor system.

The properties of the VLDPE produced in this example can be found in Example 3.

EXAMPLES 3 TO 8

The VLDPE and LLDPE are physically blended for examples 4 to 7. VLDPE alone, LLDPE alone, and the four blends are then compression molded into plagues in accordance with ASTM D-1928, Procedure C. Variables and results are set forth in the Table.

Notes concerning the Table are as follows:
1. Percentages of VLDPE and LLDPE are by weight and based on the total weight of the blend of VLDPE and LLDPE (%).
2. Melt Index is determined in accordance with ASTM D-1238, Condition E, at,190° C. and 44 psi.
3. Melt Flow Ratio is the ratio of Flow Index to Melt Index. Flow Index is determined by ASTM D-1238, Condition F; measured at 10 times the weight used in the Melt Index test above.
4. Density is determined under ASTM D-1505. A plague is conditioned for one hour at 100° C. to approach equilibrium crystallinity. Measurement for density is then made in a density radient column and density values are reported as gram per cubic centimeter (g/cc).
5. Tensile strength at 2 inches per minute (psi); tensile strength yield (psi); and ultimate elongation (%) are determined under ASTM D-412.
6. Secant Modulus at one percent (psi) is determined in accordance with ASTM D-638.
7. Environmental Stress Crack Resistance (ESCR) [10% IGEPAL (slit) $F_{50}$] is determined in accordance with ASTM D-1248, Type-1, Class A, Category-4 (hours).
8. Haze per millimeter of thickness is determined in accordance with ASTM D-1003.

TABLE

| Example | 3 | 4 | 5 | 6 | 7 | 8 |
|---|---|---|---|---|---|---|
| % VLDPE | 100 | 60 | 50 | 40 | 30 | — |
| % LLDPE | — | 40 | 50 | 60 | 70 | 100 |
| Melt Index (g/10 min.) | 5.7 | 2.6 | 2.2 | 1.65 | 1.52 | 0.78 |
| Melt Flow Ratio | 28 | 39 | 39 | 46 | 46 | 60 |
| Density (g/cc) | 0.900 | 0.910 | 0.911 | 0.912 | 0.913 | 0.918 |
| Tensile Strength 2 in/min (psi) | 1450 | 1880 | 2220 | 2350 | 2540 | 2560 |
| Tensile Strength Yield (psi) | 681 | 955 | 1020 | 1070 | 1120 | 1050 |
| Ultimate Elongation (%) | 884 | 864 | 890 | 864 | 872 | 744 |
| Secant Modulus (psi) | 15900 | 26700 | 29300 | 30500 | 31900 | 38800 |
| ESCR (hours) | >500 | >500 | >500 | >500 | >500 | >500 |
| Haze | 3.7 | 3.21 | 2.99 | 2.38 | 2.19 | 3.12 |

I claim:

1. A polyolefin blend comprising:
(a) a linear low density copolymer of ethylene and at least one alpha-olefin having 3 to 6 carbon atoms produced in the presence of an activated supported catalyst containing chromium and titanium, said copolymer having a density in the range of about 0.916 to about 0.922 gram per cubic centimeter and a melt index in the range of about 0.30 to about 1.2 grams per 10 minutes and being present in an amount of about 68 to about 72 percent by weight; and (b) a very low density copolymer of ethylene and at least one alpha-olefin have 3 to 8 carbon atoms produced in the presence of an activated supported catalyst containing magnesium, titanium, halogen, and an electron donor, said copolymer having a density in the range of about 0.890 to about 0.910 gram per cubic centimeter and a melt index in the range of about 0.30 to about 8.0 grams per 10 minutes and being present in an amount of about 28 to about 32 percent by weight, the percent by weight being based on the total weight of components (a) and (b).

* * * * *